Dec. 20, 1960  J. M. HUNT  2,964,857
SIMULATION OF ERRORS IN AN ATTITUDE GYRO
Filed Jan. 8, 1957  9 Sheets-Sheet 1

JOHN M. HUNT
INVENTOR.

BY *Darby & Darby*
ATTORNEYS

Dec. 20, 1960 J. M. HUNT 2,964,857
SIMULATION OF ERRORS IN AN ATTITUDE GYRO
Filed Jan. 8, 1957 9 Sheets-Sheet 2

JOHN M. HUNT
INVENTOR

BY *Darby & Darby*

ATTORNEYS

JOHN M. HUNT
INVENTOR

Dec. 20, 1960     J. M. HUNT     2,964,857
SIMULATION OF ERRORS IN AN ATTITUDE GYRO
Filed Jan. 8, 1957     9 Sheets-Sheet 6

JOHN M. HUNT
*INVENTOR.*

BY *Darley & Darley*

ATTORNEYS

FIG. 9

JOHN M. HUNT
INVENTOR

BY Darby & Darby
ATTORNEYS

FIG. IIA

FIG. IIB

United States Patent Office 2,964,857
Patented Dec. 20, 1960

2,964,857

SIMULATION OF ERRORS IN AN ATTITUDE GYRO

John M. Hunt, Binghamton, N.Y., assignor to General Precision, Inc., a corporation of Delaware Filed Jan. 8, 1957, Ser. No. 633,100

11 Claims. (Cl. 35—12)

The present invention relates to the simulation of the attitude indications in a grounded trainer simulating the flight of an aircraft and, more particularly, to the improved simulation of an attitude gyro during simulated flight.

As is well known to those skilled in the art, most modern grounded trainers solve equations of motion of the simulated flight of an aircraft by means of analog computer equipment to provide instrument and other output indications simulating the output indications of actual aircraft instruments and indicators under identical actual flight conditions. The training value of these grounded trainers is known to be closely related to the degree of precision with which the flight environment including instrument indications are simulated.

One of the more important flight instruments in a real aircraft is an attitude gyro, variously referred to as the Vertical Gyro or Artificial Horizon. This instrument provides the pilot with a direct indication of the attitude of his aircraft in the lateral and longitudinal plane of the aircraft and may be considered as replacing the true horizon under instrument flying conditions. Aircraft attitude is conventionally defined by three angles, namely, heading angle $\Psi$, pitch angle $\theta$, and bank angle $\phi$, which angles are usually called the Euler angles of the aircraft. The gyro, which will be described in considerable detail hereinafter, generally may comprise a rotor mounted in bearings provided by a gyro housing for spinning about a vertical axis generally corresponding to the vertical earth or Z axis. This housing may itself be pivotally mounted athwartships in bearings provided by a gimbal ring in a manner providing freedom of movement of the housing about a lateral axis parallel to the aircraft Y axis. Further, this gimbal ring may be rotatably mounted in an instrument case such that the gimbal ring is itself rotatable about a longitudinal axis parallel to the aircraft X axis. A horizon bar may be mounted on the gimbal ring and driven in an "up and down" direction by the gyro housing as a result of relative movement between the gimbal ring and housing about the lateral axis of the aircraft. Finally, the horizon bar thus mounted also may rotate in unison with the gimbal ring as it rotates relative to the instrument case about the longitudinal axis of the aircraft. Idealistically, the rotor spinning about its vertical axis will maintain that attitude in true space regardless of the changes of attitude of the craft and instrument case mounted thereon. In an attitude gyro the housing, and the spinning rotor may be considered to be fixedly oriented in true space with respect to the vertical earth axis or Z axis. Since the attitude of the aircraft on which the instrument case is mounted may be continually changing, this spinning rotor and housing may be utilized as a convenient reference to determine the magnitude of these deviations. As a result attitude changes of the craft may be detected by reference to the spinning rotor and resolved into pitch and bank Euler angle indications by the horizon bar as it measures angular rotation between the housing and gimbal ring about the aircraft lateral or Y axis and the angular rotation between the gimbal ring and the instrument case about the craft longitudinal axis. A miniature aeroplane fixedly attached to the instrument case and aircraft instrument panel may be used as a reference index for the gyroscopically stabilized horizon bar, which bar remains parallel with the true horizon.

Unfortunately, as will be described in more detail hereinafter, the practical application of the principles as set forth above in providing the artificial horizon varies from the ideal as a result of considerable amounts of inertia and bearing friction which exist in the attitude gyro, thereby creating forces which act on the spinning rotor to create false precessional rotations in the indication provided by the horizon bar, in both pitch and roll. In order to counteract these false indications gyro manufacturers have utilized erection systems which operate in a manner to correct such error precessions by creating equal and opposite forces and corrective precessions. These erection systems may take several forms, electrical torque motors operated by gravity-actuated mercury switches or gravity-actuated vane and air-driven force-producing means being typical examples. While erection does not take place without a time lag, each type of system may be considered to have a characteristic mathematical transfer function between the corrective erection rate and magnitude of the attitude change. Further, for purposes of analysis each of these gravity actuating or detecting means may be considered as an ordinary pendulum. While these gravity detecting means work well in determining the need for the operation of the erection system (during changes of pitch angle $\theta$ and bank angle $\phi$) they are also affected in their operation by acceleration forces developed during flight which may or may not involve some degree of attitude change. In this way, significant errors known as turn errors may be developed in the erection system by centrifugal forces developed in turns. Some attitude gyros have reduced the amount of error resulting in the erection system from the acceleration of the aircraft for certain reoccurring flight conditions by tilting the vertical axis of the spinning rotor. For example, an attitude gyro known as the type J8 built by Sperry Gyroscope Co. is tilted forward 2 degrees in order that the centrifugal forces acting on the erection system during a standard rate turn of an aircraft may be compensated for by the creation of equal and opposite forces. It should be noted that these centrifugal forces may account for only a portion of the acceleration error existing during a standard turn.

These precession errors described above as resulting from friction and inertia forces and corrected by an erection means during normal maneuvers (changes in attitude) of an aircraft may become quite large during violent maneuvers (acrobatics), thereby creating large forces which may result in damage to the instrument. As a result "caging" means are often employed to lock the instrument, so that the horizon bar is fixedly positioned to indicate zero bank and pitch angles during these unusual maneuvers. A warning flag also may be made to appear on the instrument to indicate the caged condition and consequent unreliability of the instrument. When the instrument is uncaged, a substantial amount of time, of the order of five minutes, is usually required before the attitude gyro erects and provides a satisfactory presentation of the attitude of the craft.

As already suggested, it is important in the flight simulation arts that the simulated attitude gyro reflect as nearly as possible the indications of a real attitude gyro operating under similar flight conditions. Therefore, the problem of simulating the functions of an attitude gyro or gyro horizon in a grounded aircraft trainer is basically that of providing an indicating device responsive to simulated aircraft attitude in the pitch and roll planes while having an instrument presentation representing that of a true attitude gyro. Without considering the shortcomings and idiosyncrasies of behaviour of particular attitude gyros, this problem resolves itself into the comparatively simple expedient of having two servo systems whose shaft outputs are responsive to the simulated pitch and roll angles of the simulated aircraft in a manner such that each may be simultaneously used to position the horizon bar of a simulated attitude gyro or gyro horizon. However, accurate simulation often requires that these correct simulated pitch and roll angles be modified in accordance with the above described shortcomings of a real attitude gyro.

It is therefore a primary object of the present invention to provide an improved simulation of an attitude gyro in a grounded flight trainer.

It is another object of the present invention to provide an improved simulation of an attitude gyro in a grounded flight trainer including means for simulating the operation of an exemplary erection system during attitude changes.

It is a further object of the present invention to provide an improved simulation of an attitude gyro of a grounded aircraft trainer including means for simulating turn errors in a gyro erection system.

It is still another object of the present invention to provide an improved attitude gyro in a grounded aircraft trainer including the simulation of the effects of tilting an attitude gyro in order to diminish "turn errors" during simulated standard rate of turns.

It is another object of the present invention to provide an improved simulation of an attitude gyro in a grounded aircraft trainer including means to simulate the effects of caging and uncaging.

It is another object of the present invention to provide an improved attitude gyro in a grounded aircraft trainer including means for simulating longitudinal acceleration errors in a simulated gyro erection system.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Typical indications of an attitude gyro are shown in Figs. 1A, 1B, 1C, 1D and 1E which indicate 30° right bank, 30° left bank, level flight, climb and glide respectively.

Figure 1:
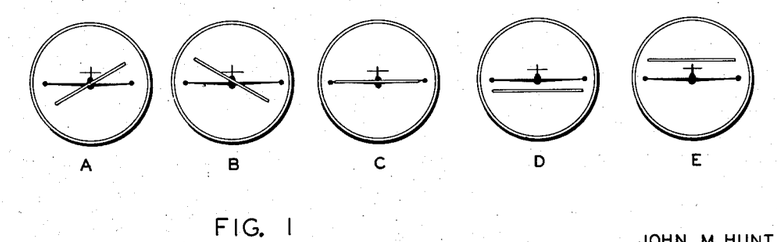
Figs. 1A, 1B, 1C, 1D and 1E are views of the presentation of an attitude gyro instrument seen by the pilot of an aircraft during various flight attitudes.
Figure 2:
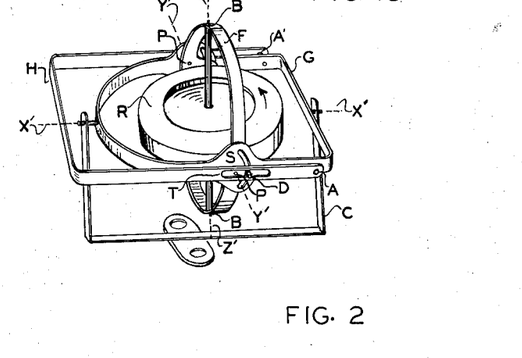
Fig. 2 is a pictorial view of the essential features of one type of attitude gyro instrument.

Referring to Fig. 2 wherein is shown the basic construction of an exemplary attitude gyro or gyro horizon, it will be seen that the gyro rotor R spins about a vertical axis Z'—Z' mounted on bearings B in the gyro housing F. This housing is itself pivoted athwartships about an axis Y'—Y' parallel to the aircraft Y axis. The Y'—Y' axis bearings are mounted on a gimbal ring G which is itself mounted in the instrument case C and free to rotate about an axis X'—X' which is parallel to the aircraft X axis. The horizon bar H is pivoted about bearings A—A mounted on the gimbal ring and is actuated in an "up-down" direction by a fixed guide pin or cam bar D which protrudes from the gyro rotor housing through the curved clearance slot S in the gimbal ring G, so as to engage in the horizon bar operating slot T. The bar is thus able to turn about the X'X' axis in unison with the gimbal ring, and is therefore responsive to the aircraft's lateral or roll attitude; and it is moved up and down by the gyro stabilized housing, thus being responsive to the aircraft's pitch attitude.

Figure 5:
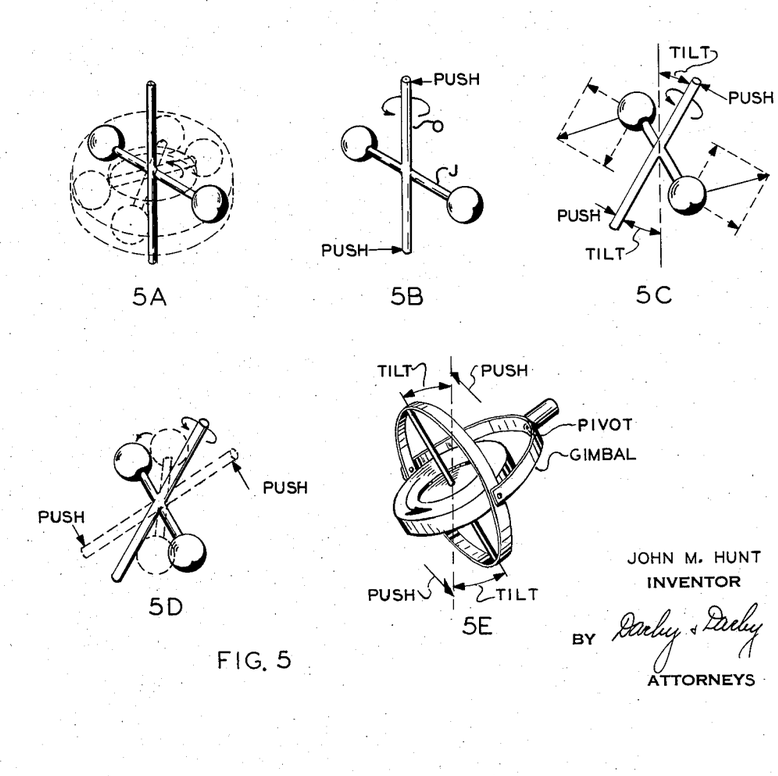
Figs. 5A, 5B, 5C, 5D and 5E are accessory to an understanding of gyrostatic phenomena.

While an ideal attitude gyro would comprise a rotor rotating on a vertical axis providing an errorless vertical reference in true space, the practical problems of mounting create upsetting forces, causing error precessions of the vertical references. Therefore, it is useful to consider the behaviour of a spinning gyroscopic rotor under the influence of disturbing forces, in order that a better understanding may be had of the nature and direction of the precessional effects. For example, the rotor of a gyroscope rotating at high speed in a horizontal plane with its shaft erected vertically may be envisaged as being composed of a number of diametrically opposed equally and oppositely counter balanced weights as shown in Fig. 5A. Referring to one such pair of weights mounted about the axis of rotation as shown in Fig. 5B, the axis of rotation may be imagined to be given a horizontal push. It is apparent that the weights will now have two motions at right angles to one another, and from the fundamental laws of mechanics must pursue a resultant course of motion as shown by the solid line vectors in Fig. 5C. Now since the axle O is rigidly fixed to the arm J (Fig. 5B) on which the balls are mounted, the axle must tilt when the balls move in their diagonal resultant motion as shown in Fig. 5D. If the rotor is now considered to be composed of an infinite number of diametrically opposed equal weights, it is apparent that the whole wheel must tilt or "precess" at right angles to the direction of the push or impulse.

It is obvious that whereas a "push" has been envisaged in the foregoing discussion, any application of force or change of gyro attitude applied to the gyro spin axis will inevitably set up precession and develop a precessional force at right angles to the initial force. In a real instrument in a real aircraft, there is, of course, no physical "push," but there are forces acting upon the gyro representing the resultant of the various inertial and frictional forces generated by reorientation of the bearing assembly of the spinning rotor, as well as those due to the pendulous erection system and base heavy rotor housing; both of which will be referred to hereinafter. For example the frictional and inertial forces set up by movement of the gyro housing, and the gimbal and housing bearings and framework will also contribute to the resultant. It should be noted that the rotor axis always tilts in the same direction as that in which the rotor circumference is moving, when viewed from above.

In response to the precession due to upsetting forces, the rotor may be erected by means not shown so that its axis is maintained in a vertical position by the application of equal and opposite forces, thereby causing the gyro to precess slowly back to vertical. The erection system may be identical in both the roll and pitch planes. By design of the bearing support the upsetting of an attitude gyro may be limited in both roll and pitch.

In addition to the above described provisions for erection to oppose the upsetting forces, some attitude gyros or artificial horizons are provided with limits such that the bank and pitch angles indications cannot exceed a maximum magnitude in either direction. If these limits are exceeded the gyro will strike stops inside the instrument and "topple," causing very erratic indications, sweeping back and forth across the face for some 10–15 minutes before settling down to give a true indication. It should be noted, however, that while the disclosed embodiment of the present invention described hereinafter simulates a conventional attitude gyro having such limits, instruments are available which have complete freedom in the roll axis system, and a number of improved "all-attitude" gyro horizons are currently available.

In order to avoid toppling, some types of instruments have a caging device such that the mechanism may be locked when its limits are likely to be exceeded during acrobatics. It should be observed that the instrument should be uncaged at all times unless the rotor is stationary or during acrobatics. As already suggested, a flag may be used to indicate the unreliability of the instrument while in the caged condition. Uncaging should be effected at least five minutes before take off to allow the gyro time to erect to true vertical. When the gyro is uncaged in the air after aerobatics, the time to erect to true vertical can be reduced by uncaging in level flight.

As mentioned above, the attitude gyro performance and behaviour is complicated by the need for simulating certain idiosyncrasies of behaviour, or "errors," which are peculiar to gyro horizons. One such error to which the gyro horizon, and any other aircraft gyro instrument having a vertical spin axis, is subject is known as "Turn Error." This error is due to two separate effects produced during a turn. The first of these effects is due to the fact that the erection systems of gyro horizons are normally gravity controlled. The modern electric horizons commonly use gravity-operated mercury switches which control roll and pitch erection torque motors, while earlier instruments had gravity-controlled vane and air erection systems. These gravity devices are displaced from vertical during a turn and cause the gyro to precess to some position out of true vertical. As explained below, this error may be compensated for a given turn condition by inclining the gyro axis so as to oppose the induced error.

The second of these errors, called pendulosity error, is caused by the fact that rotor assemblies of attitude gyros may be constructed so that they are slightly base heavy to insure a quick initial erection. The centrifugal force produced during a turn will therefore cause the gyro to precess to a false vertical, owing to the application of a tilt force to the gyro rotor spin axis, which causes it to behave in the manner described above. As in the case of erection error, this also may be compensated for a given condition of turn by an initial bias or inclination of the gyro axis so as to oppose the induced error. It will be apparent that the pendulous erection system gravity members will also be displaced by linear acceleration or deceleration. Such displacements will manifest themselves as gyro rotor axis tilts or false verticals accompanied by precession.

An accurate simulation of a gyro horizon in a grounded aircraft trainer therefore should provide method and means for introducing the visual and physical effects of these errors which manifest themselves in a real aircraft as an incorrect indication of aircraft attitude, resulting in a nose-up and wing down attitude when the aircraft is really horizontal, and has, in fact, returned to steady and level flight.

For a better understanding of the nature and purpose of this invention as later described, it is necessary to consider these effects and the method of compensation in some detail.

Figures 3A, 3B:
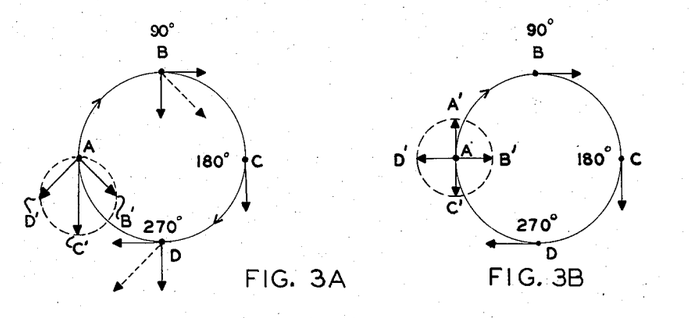
Fig. 3A is a diagram useful in understanding the turning error of a basic attitude gyro instrument.
Fig. 3B is a diagram useful in understanding the behaviour of a corrected attitude gyro instrument.

The portion of the erection error which is due to the centrifugal force on the erection mechanism may be considered by having regard to the action of both the gyro and the aircraft during a 360° turn. Referring to Fig. 3A, the large circle represents the path of the aircraft during a right hand turn of 360°, commencing at point A. During the turn, the gravity erection system will be laterally displaced by centrifugal force, resulting in the application of a torque which will cause precession to take place and initially tilt the gyro to the right with respect to the aircraft heading, if the gyro spins in a counter clockwise direction viewed from above. Assuming now that the gyro is quite free, i.e., not gimbal mounted (and free of frictional or inertial forces associated with the mounting system), the position of the top of the gyro axis with respect to the turn may be plotted. Owing to the fact that the torque applied by the erection system to the gyro axis is a constant and at right angles to the instantaneous heading, and toward the center of the turn, it follows that if the heading changes from 0–360°, then the top of the gyro axis describes a circle which is 90° in advance of the aircraft itself. This is shown by the small dotted circle in Fig. 3A. Since the gyro was vertical at A, any chord of this small circle from A will indicate the real tilt of the gyro axis with respect to true vertical. Thus A—B' represents the magnitude and direction of tilt after a 90° turn and so on. By virtue of the mounting of the rotor of the attitude gyro of the present embodiment for rotation in both the pitch and roll planes of aircraft, the tilt may be resolved into two components, one forward and the other to the right, giving attitude errors in climb and left bank respectively of the heading as shown in Fig. 3A. Similarly, the chord AC' indicates the direction and magnitude of tilt after a heading change of 180° when it is at its maximum. Since chord AC' coincides with the instantaneous aircraft heading, only a pitch error indication results. At D the components of AD' indicates error in pitch and right bank respectively. On return to 0° the tilt is zero.

It can thus be seen that when the gyro horizon axis is vertical, the top of the axis describes a circle in a clockwise direction during a right hand turn, causing variable errors and returning to normal after 360°. Therefore, if the top of the axis were arranged to describe a circle about itself during the turn, a compensating tilt with respect to aircraft attitude would be obtained. This may be done by initially tilting the gyro axis forward. The effect of this is shown in Fig. 3B where the point A represents the true vertical through the rotor center, and AA' represents the forward tilt. It can be seen that the top of the axis now describes a circle about A and at the same rate as the aircraft's rate of turn. Thus the amount of tilt and its direction with respect to aircraft attitude are constant, and, by compensating the horizon bar to be level when the gyro axis is tilted forward by this compensating amount, a level attitude indication is given at all points in a turn.

The tilt error magnitude and corrections due to false erection resulting from centrifugal effects on the pendulous erection system during a turn can be considered as being directly proportional to erection rate, and inversely proportional to rate of turn. A typical correction for an air driven gyro horizon would be obtained by a counterbalancing the fore and aft erection system so that the top is 2° forward, this amount being based on a standard or "rate one" turn of 3 degrees per second. A typical forward tilt determined in the same manner for an electrical system might be 1.6°. This same method may be used in real attitude gyros in real aircraft to compensate for gyro upsetting errors resulting from the use of a base heavy rotor cage assembly, which errors have been referred to above collectively as pendulosity error.

Thus in a real aircraft, and for a real instrument, it is possible to cancel out the precessional effects of centrifugal force on a vertical gyro by the application of compensating tilts, although very small errors due to friction and combined effects of pendulosity and erection may remain. The gyro is then said to be correct for the selected speed and rate of turn for which it has been compensated. At other rates of turn there will be small errors, but these will be much less than those for which the gyro has been compensated.

It can now be seen that the accurate simulation of an exemplary gyro horizon in a grounded aircraft flight simulator must provide reasonably accurate simulation of the acceleration and turning or "upsetting" errors in the simulated erection system, simulation of the 2° tilt in the gyro reference axis, and simulation of the effects of caging and uncaging the gyro. It will be noted that no attempt has been made herein to simulate the pendulosity error compensation suggested above. However, it follows that the same method disclosed herein for the simulation of the 2° tilt correction for a turn error (erection) resulting from a standard turn may be used for such a purpose.

The means and method of the present disclosure have been simplified to the extent that the errors introduced are not quantitatively accurate for extremely large errors of the order of 45° or more in gyro position with respect to vertical. However, normal errors introduced by fore and aft and turn acceleration, and the unavoidable errors introduced in uncaging the gyro are faithfully simulated. The following symbols are assigned to the various angles and error angles:

$\theta_1$ = indicated pitch angle.
$\phi_1$ = indicated bank angle.
$\Delta_\phi$ = bank angle error = $\phi_1 - \phi$
$\Delta_\theta$ = pitch angle error = $\theta_1 - \theta + 2°$
$P_\phi$ = instantaneous precession rate about gyro roll axis.
$P_\theta$ = instantaneous precession rate about gyro pitch axis.
$G_y$ = instantaneous angle of a pendulous vertical with respect to true vertical measured about aircraft X axis.
$G_x$ = instantaneous angle of a pendulous vertical with respect to true vertical measured about aircraft Y axis.
$\Delta_N$ = angular displacement of the gyro axis measured about an East-West horizontal line, and manifested by a linear displacement of the upper gyro bearing in a North-South direction.
$\Delta_E$ = angular displacement of the gyro axis about a North-South horizontal line, and manifested by a linear displacement of the upper gyro bearing in an East-West direction.
$\psi$ = aircraft heading angle.
$\lambda$ = ball bank indicator angle.

All angular rates and angles are taken in degrees/second and degrees respectively, linear accelerations being measured in ft./sec. From considerations of the foregoing definitions and description of gyro horizon behaviour, it will be apparent that in a real instrument and for a real aircraft, the following definitions and conditions may obtain.

When $\Delta_\phi$ is positive, the gyro horizon indicates to the pilot that the aircraft is in an attitude with the left wing down when, in reality, the aircraft is actually level. When $\Delta_\theta$ is positive, the gyro horizon indicates that the aircraft is at a nose up attitude when, in reality, the aircraft is actually level. When $P_\phi$ is positive the top of the gyro is precessing towards the left wing tip, thereby increasing the instantaneous value of $\Delta_\phi$, although this occurs indirectly through a modification of the values of $\Delta_N$ and $\Delta_E$. When $P_\theta$ is positive, the top of the gyro axis is precessing towards the nose of the aircraft, thereby increasing the instantaneous value of $\Delta_\theta$, this again occurring indirectly. Thus when $\Delta_\phi$ is positive the top of the gyro will be tilted towards the left, and when $\Delta_\theta$ is positive, the top of the gyro is tilted towards the nose of the aircraft. When $G_y$ is positive, the effective gravity vector angle corresponds to that of a pendulum with the bob to the right of vertical as would be encountered during a left turn. When $G_x$ is positive, the effective gravity vertical corresponds to that of a pendulum with the bob forward, as when the aircraft is decelerating due to drag being greater than thrust. When $\Delta_E$ is positive, the top of the gyro is tilted towards true East, while when $\Delta_N$ is positive, the top of the gyro is tilted towards due North.

The exemplary gyro is designed, for reasons outlined above, with the top of the rotor axis tilted 2° forward when the erection system is at equilibrium, and the variables refer to the actual angle of the gyro axis. Then, during steady state flight towards the North, the erection system would cause $\Delta_E$ to become zero, and $\Delta_N$ to become $+2°$. Similarly during steady state flight towards the south, the erection mechanism would cause $\Delta_N$ to become $-2°$ as the 2° nose forward tilt of the erection system precesses the top of the gyro to a position 2° south.

Figure 4:
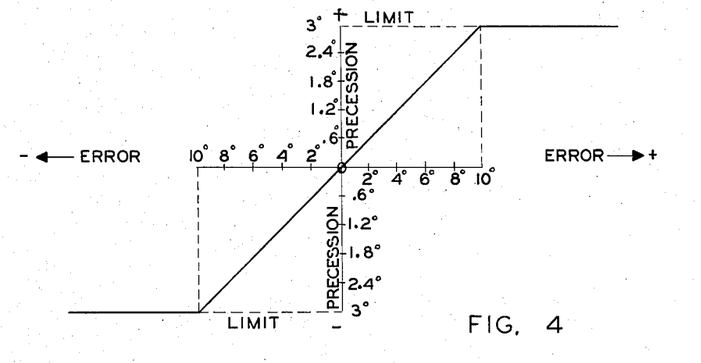
Fig. 4 is a graph showing the precession error transfer function characteristics of an exemplary attitude gyro instrument employing a limited linear erection system.

The pendulous erection system of the exemplary gyro produces a precession rate of approximately .3° per minute per degree of error between the gyro vertical and the pendulous vertical. This erection rate is limited at an error angle of $\pm 10°$ to a constant value of 3° per minute erection rate, resulting in the erection rate transfer function being a straight line with horizontal sections at either extreme representing the limiting value of 3° per minute, as shown in Fig. 4. This function is referred to in the mathematics herein as $f_1$. Throughout the analysis of the gyro precession errors it is assumed that the angles involved (other than the pitch and bank angle) are small, so that the sines and tangents of the angles may be assumed equal to the angles themselves.

It is obvious that $$G_y = \lambda - \phi \tag{1}$$

where $\lambda$ is the ball angle, and $\phi$ the true bank angle.

Figure 16:
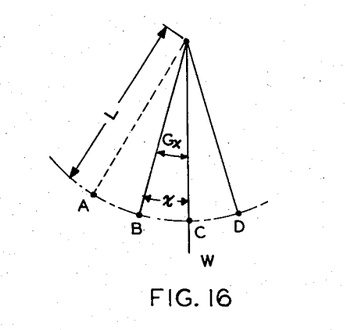
Fig. 16 is a diagram useful in understanding the angle generated between the true and pendulous verticals of a pendulous system during acceleration.

Regarding the pendulous erection system as a simple pendulum we may write, since force = mass × acceleration, $$W \sin G_x = \frac{W}{g} \times \frac{d^2x}{dt^2} \tag{2}$$

where X is the length of the arc BC in Fig. 16 then $$\sin G_x = \frac{1}{g} \times \frac{d^2x}{dt^2} \tag{3}$$

or if $G_x$ is small, i.e. $\sin G_x = G_x$ in radians, $$G_x = \frac{a_x}{g} \tag{4}$$

where $a_x$ is the instantaneous linear acceleration $$\frac{d^2x}{dt^2}$$

Converting this to degrees we have, since one radian= 57.3°

$$G_x = \frac{A_x}{g} \times 57.3 \qquad (5)$$

or $\qquad G_x = -1.78 a_x$

Here it has been assumed that $a_{za}=g=-32.2$ feet per second. The effect of the g vector along the aircraft $x$ axis has been deliberately ignored. Recalling the definitions of $P_\theta$ and $P_\phi$ $$P_\phi = f_1(G_y - \Delta_\phi) = f_1(\lambda - \phi - \Delta_\phi) \qquad (6)$$

$$P_\theta = f_1(-G_x + 2° - \Delta_\theta) = f_1(1.78 a_x + 2° - \Delta_\theta) \qquad (7)$$

where $f_1$ is the erection rate transfer function as defined above.

The angular precession rates $P_\phi$ and $P_\theta$ must now be resolved by means of direction cosines about the aircraft heading axis to an axis system fixed in space to give the values $\dot{\Delta}_N$ and $\dot{\Delta}_E$.

The expressions for $\dot{\Delta}_N$ and $\dot{\Delta}_E$ are as follows:

$$\dot{\Delta}_N = P_\phi \sin \Psi + P_\theta \cos \Psi \qquad (8)$$

$$\dot{\Delta}_E = P_\theta \sin \Psi - P_\phi \cos \Psi \qquad (9)$$

We may now integrate the quantities $\dot{\Delta}_N$ and $\dot{\Delta}_E$ in (8) and (9) above to obtain the angular errors $\Delta_N$ and $\Delta_E$ of the gyro axis with respect to space. These must then be resolved by means of direction cosines about the aircraft heading to obtain the Euler angle error quantities $\Delta_\theta$ and $\Delta_\phi$ according to the following expressions:

$$\Delta_\theta = \Delta_E \sin \Psi + \Delta_N \cos \Psi \qquad (10)$$

$$\Delta_\phi = \Delta_N \sin \Psi - \Delta_E \cos \Psi \qquad (11)$$

Figure 6:
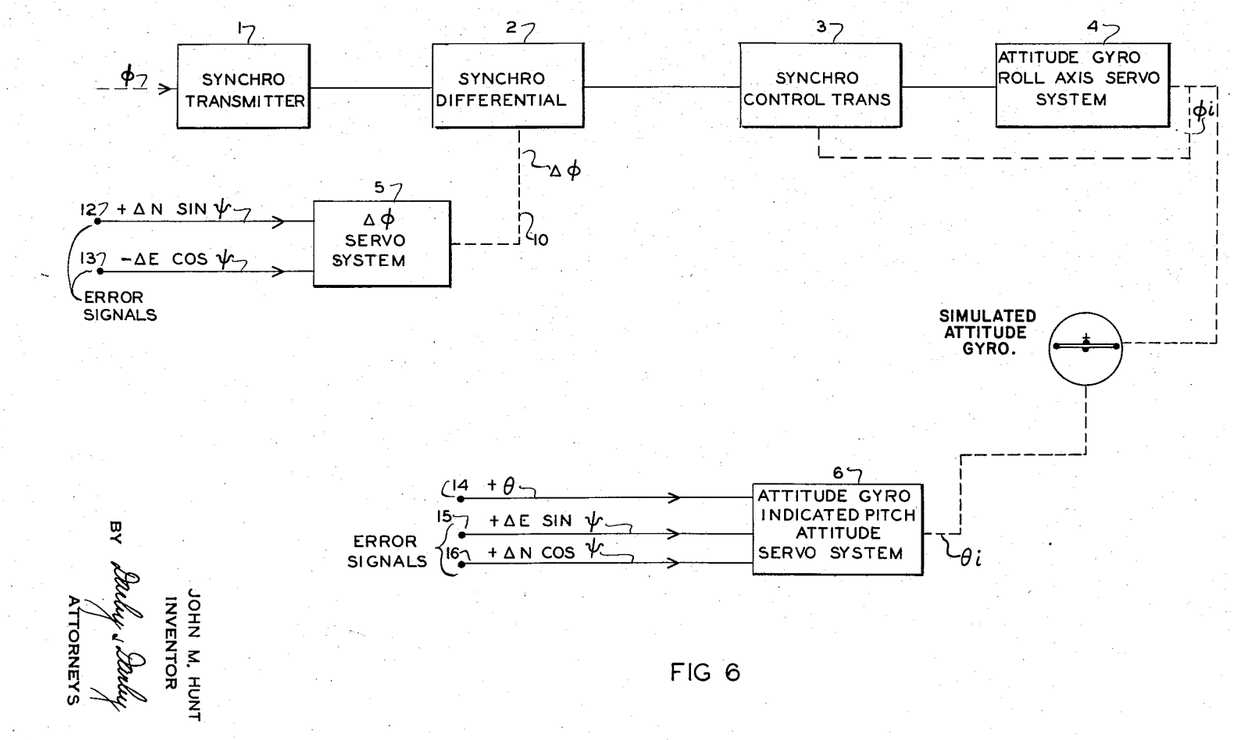
Fig. 6 is a schematic diagram partially in block form showing how, in a typical simulator, pitch and bank (roll) actions may be applied to a simulated instrument to position the horizon bar of the instrument.

Referring now to Fig. 6 which shows a simplified schematic according to the principles of the invention, and having regard to the foregoing description of gyro horizon behaviour, the simulated attitude-gyro roll-axis servo system 4 may be positioned by means of mechanical, or "shaft" inputs of $\phi$ and $\Delta_\phi$ which are applied through a synchro chain consisting of the synchro transmitter 1, the synchro differential 2, and the synchro control transformer 3, which also acts as the follower means for the roll axis servo system 4. The $\Delta_\phi$ shaft output may be obtained from the $\Delta_\phi$ position servo system 5 which is actuated by the gyro position error signals $\Delta_N \sin \Psi$ and $-\Delta_E \cos \Psi$, applied to terminals 12 and 13 respectively. These error signals are derived as input voltage quantities from computing means to be described later. In similar manner, the simulated attitude gyro indicated pitch attitude servo system may be positioned by inputs of $\theta$ and the gyro position error signal inputs of $+\Delta_E \sin \Psi$, the gyro axis $E/W$ displacement resolved about the heading angle $\Psi$, and $+\Delta_N \cos \Psi$ which are applied to terminals 14 and 15 and 16 respectively, the gyro axis $N/S$ displacement resolved about the heading angle $\Psi$, of block 6 of Fig. 6 providing means for generating the indicated pitch angle $\theta_i$ as a shaft position. The detailed mechanization for block 6 may be generally identical with that shown in Fig. 6 as amplified by Figs. 7 and 8 and discussed below for generating the indicated bank angle $\phi_i$ or it may take other forms as disclosed by Fig. 9 and discussed below. Thus it can be seen that the simulated roll indication of the simulated attitude gyro is a function of the true simulated roll angle modified by the addition of the simulated Euler roll angle error $\Delta_\phi$, while the simulated pitch indicator of the simulated attitude gyro is a function of the true simulated pitch angle modified by the addition of the simulated Euler pitch angle error $\Delta_\theta$. Inasmuch as the mechanical details of the simulated attitude gyro instrument itself form no part of the present invention, the simulated attitude gyro is shown only symbolically in Fig. 6.

Figure 7:
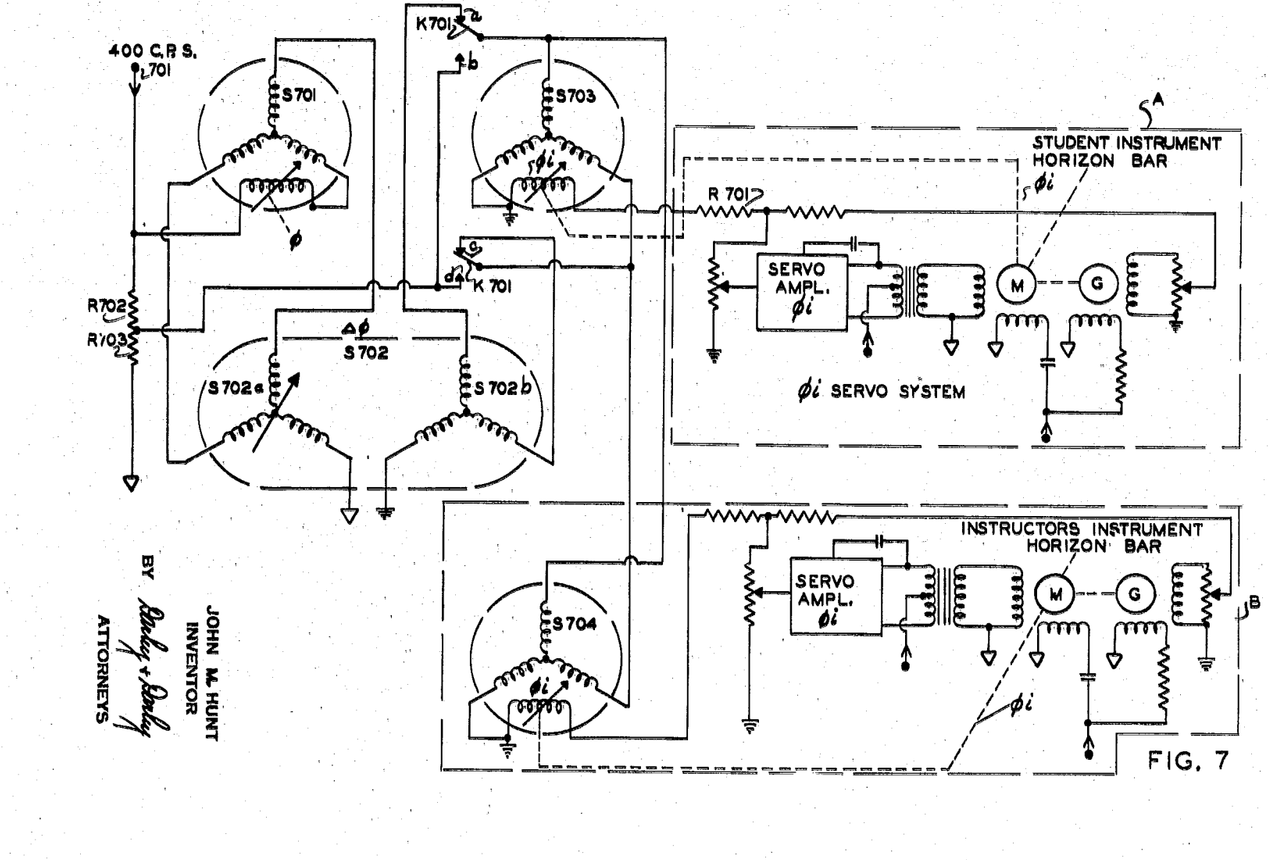
Fig. 7 is a circuit diagram showing in detail exemplary apparatus for simulation of the bank angle presentation of an attitude gyro instrument.
Figure 8:
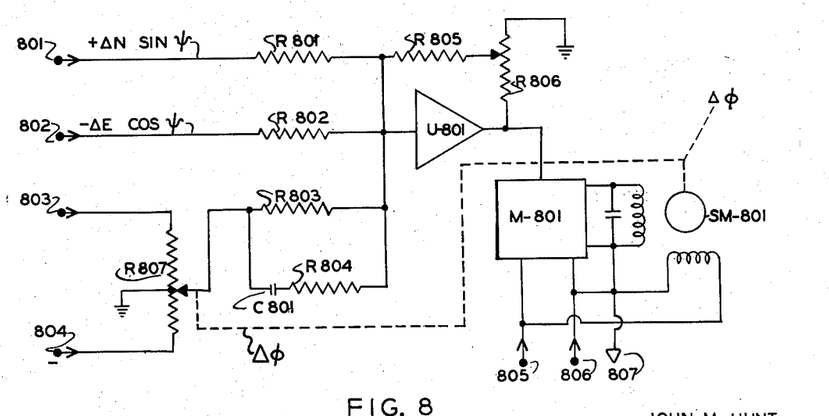
Fig. 8 is a circuit diagram illustrating in detail exemplary apparatus for simulation of simulated bank angle error quantity $\Delta\phi$.
Figure 12:
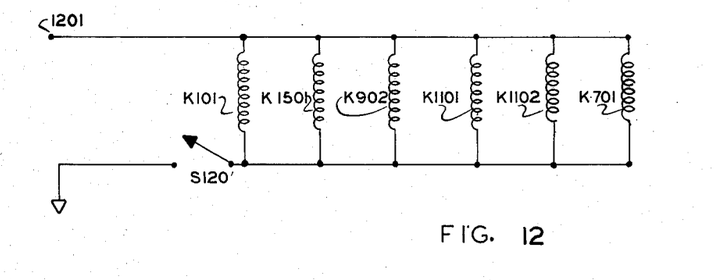
Fig. 12 is a circuit diagram useful in understanding various relay functions in the illustrative system.

Referring now to Fig. 7, which shows the simulated bank angle presentation system, a 400 c.p.s. excitation is applied via terminal 701 to the control winding of synchro transmitter S701, the shaft of which is positioned by the mechanical shaft output of the $\phi$ or bank angle servo of a conventional flight simulator system. The induced secondary output of synchro transmitter S701 is applied to excite the control winding S702$_a$ of the synchro differentiator S702, the rotor shaft of which is positioned by the mechanical shaft output of a $\Delta_\phi$ or bank angle error servo to be described later in connection with Fig. 8. The induced secondary output potential of the synchro winding S702$_b$ is used to excite the synchro control transformer S703 via closed relay contacts K701$_a$ and K701$_c$. This control transformer functions as the follow-up means for the $\phi_i$ or indicated bank angle servo system contained within dotted frame A. The control winding shaft of the synchro follow-up means S703 is positioned by the mechanical shaft output of the $\phi_i$ servo system, which may comprise a conventional position servo system excited by the output potential derived from the control winding of S703, the potential being applied via scaling resistor R701 to the $\phi_i$ servo input circuit. The shaft position of the $\phi_i$ servo system can thus be seen to be proportional to the sum of the mechanically supplied input angles $\phi$ and $\Delta_\phi$ and in fact solves the equation $$\phi + \Delta_\phi = \phi_i$$

wherein the symbols have the same meaning as heretofore described. The induced secondary output of the synchro differentiator S702 is also applied to excite synchro control transformer S704 which functions as the follow-up means for the duplicate $\phi_i$ servo system contained within dotted frame B. Two servo shaft outputs are thus available which are a measure of $\phi_i$, the indicated bank angle, and are used to position the horizon bar in the student's and instructor's simulated attitude gyros respectively. Relay contacts K701$_b$ and K701$_d$ when operated serve to apply reduced 400 c.p.s. excitation to the excitation windings of the duplicated control transformers S703 and S704 and thereby simulate caged attitude gyro systems by summing the $\phi_i$ servo systems to zero. The excitation necessary to operate the caging relay K701 is derived by means of switch S120, Fig. 12, which is operated when the caging knob on the simulated instrument is turned to the "locked" or "caged" position. It is apparent that in order for this simulated "caging" to be effective, the $\Delta_\phi$ error voltage signal must be made to assume such a value as to cancel out the instantaneous value of the true bank angle $\phi$. The expedients adopted to achieve this end are described later.

Referring now to Fig. 8 wherein is shown the means for deriving the simulated bank angle error signal $\Delta_\phi$ required for operation of the $\phi_i$ system described above in connection with Fig. 7, an input voltage commensurate with $+\Delta N \sin \Psi$, one of the terms defining Equation 11 above for the bank angle error $\Delta_\phi$, is derived as explained later in connection with Fig. 10$a$ and applied via terminal 801 and summing resistor R801 to the input terminal of summing amplifier U801, which is provided with conventional feedback means consisting of resistor R805 and potentiometer R806. A further voltage, commensurate with $-\Delta_E \cos \Psi$, representing the second term of Equation 11 for $\Delta_\phi$, also is derived as explained later in connection with Fig. 10$b$ and applied via terminal 802 and summing resistor R802 to the input of summing amplifier U801. Center tapped potentiometer R807 is excited at its extremities with positive and negative voltages applied to terminals 803 and 804 respectively, in order to provide $+\Delta_\phi$ and $-\Delta_\phi$ follow-up voltages which will be fed via the slider of potentiometer R807 and summing resistor R803 to the input of amplifier U801. The output of summing amplifier U801 is applied to magnetic amplifier M801 which together with the reference phase of motor SM801 receives 400 c.p.s. excitation via terminals 805 and 806. The magnetic amplifier M801 functions to provide a 400 c.p.s. control voltage to the control phase of motor SM801 at a magnitude commensurate with the magnitude of the simulated error signal components $+\Delta_N \sin \Psi$ and $-\Delta_E \cos \Psi$. The mechanical shaft output of the servo motor SM801 is used to position the shaft of the error reducing follow-up potentiometer R807. The resistance R804 and capacitor C801 connected in parallel across summing resistor R803 function to provide a first derivative damping network, thereby obviating the need for tachometer damping of the $\Delta_\phi$ servo system. The shaft output of the motor SM801, which is a measure of the simulated bank angle error $\Delta_\phi$, is used to position the control shaft of synchro differentiator S702 as described in connection with Fig. 7 above.

Figure 9:
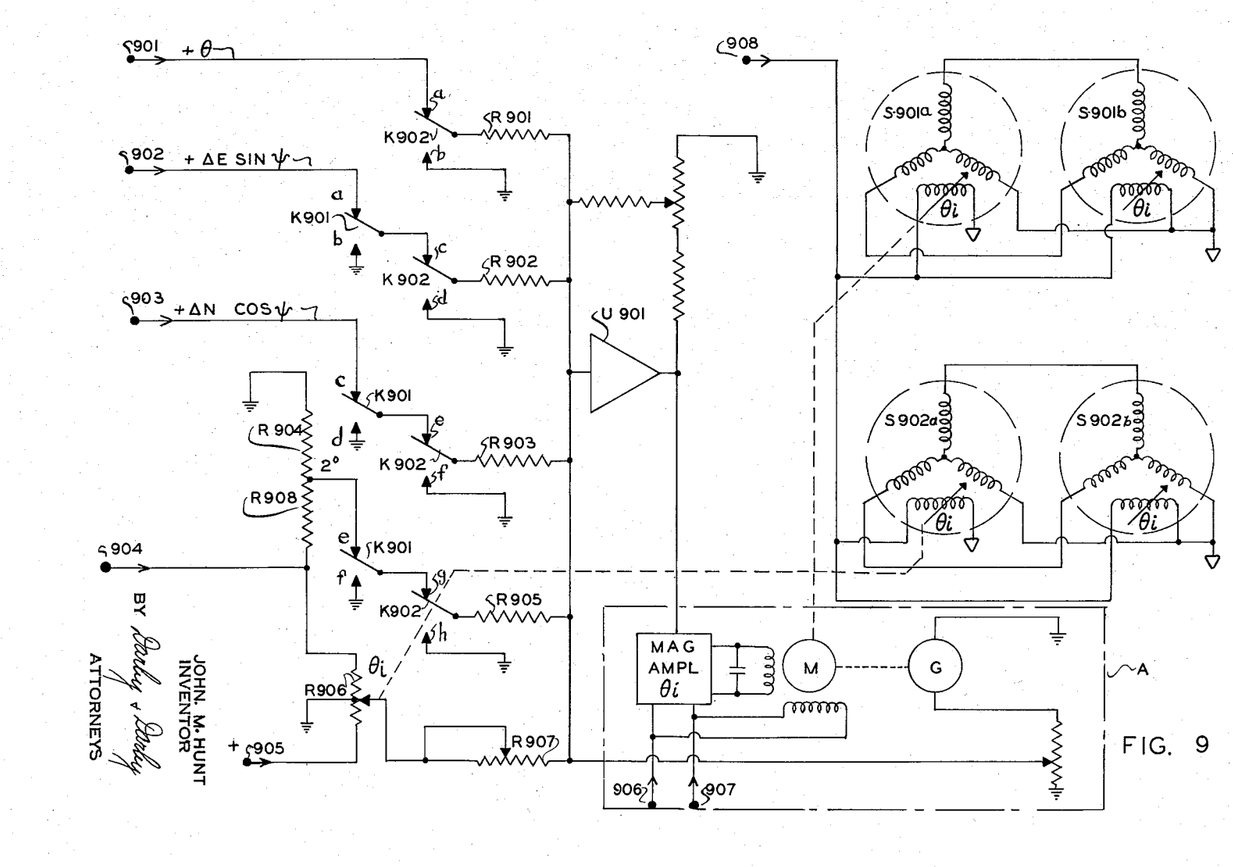
Fig. 9 is a circuit diagram illustrating how the pitch angle presentation of an attitude gyro instrument may be simulated.

Referring now to Fig. 9 which shows method and means whereby $\theta_i$ the simulated indicated pitch angle is derived for positioning the attitude gyro horizon bar in simulated climb-dive attitudes, an input voltage commensurate with $+\theta$, the simulated true pitch angle, is derived from a conventional flight simulator system, and applied via terminal 901, closed relay contact K902$_a$ and summing resistor R901, to the input of amplifier U901, which is provided with conventional feedback means. An input signal voltage commensurate with $+\Delta_E \sin \Psi$, the first term of the expression in Equation 10 for $\Delta_\theta$, and derived as explained later in connection with Fig. 10b, is applied via terminal 902 and closed relay contacts K901$_a$, K902$_c$ through summing resistor R902 to the input terminal of amplifier U901. A further quantity commensurate with $+\Delta_N \cos \Psi$, the second term of the expression in Equation 10 for $\Delta_\theta$, derived as explained later in connection with Fig. 10a, is applied via terminal 903 and closed relay contacts K901$_c$ and K902$_e$, through summing resistor R903 to the input of amplifier U901. Terminals 904 and 905, which are connected to the extremities of center-tapped potentiometer R906 are energized with negative and positive voltages, respectively, to provide positive and negative follow-up potentials at the slider of R906, positioned by the mechanical shaft output of the $\theta_i$ servo system, which is a conventional servo system contained with the dotted frame A of Fig. 9. The negative excitation applied via terminal 904 to center-tapped potentiometer R906 is also applied to the tapped resistor system R904 and R908, which is proportioned to provide a 2° tilt error signal at the junction of R904 and R908 and is applied via normally closed relay contact K901$_e$ and summing resistor R905 to the input of amplifier U901. This expedient is necessary to remove the 2° tilt compensating signal introduced earlier in the system to simulate forward tilt of the gyro spin axis as described above and as embodied in the circuitry of Fig. 11b to be described later.

Figure 13:
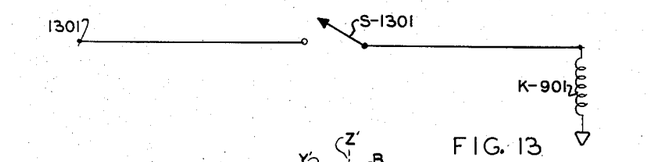
Fig. 13 is a circuit diagram showing means whereby pitch error simulation may be removed from the disclosed system.

The voltage appearing at the slider of potentiometer R906 is applied via scaling resistor R907 to the input of amplifier U901. The output of the amplifier U901 which thus sums the terms of Equation 10 for $\Delta_\theta$, the simulated pitch angle error, and adds them to $\theta$, the true simulated pitch angle, has an output which is commensurate with the terms of the equation, $$\theta_i = \theta + \Delta_E \sin \Psi - \Delta_N \cos \Psi - 2° \quad (12)$$

and is therefore a measure of the simulated indicated pitch angle. The mechanical shaft output of the $\theta_i$ servo system is used to position the control winding shaft of the simulated $\theta_i$ synchro transmitters S901a and S902a which operate the student pilot's and the instructor's simulated attitude gyro system respectively. The induced secondary outputs of the synchro transmitters S901a and S902a are applied to excite the windings of synchro repeaters S901b and S902b, respectively, in order that the remote shaft outputs of the repeaters S901b and S902b may be used to position the student's and instructor's simulated attitude horizon bars in simulated attitudes of climb and dive pitch angles. The function of the K902 relay contact system is to "cage" the simulated attitude gyro in respect of pitch motion, and this is achieved by grounding the input system of the simulated $\theta_i$ servo amplifier U$_1$, effectively removing the instantaneous value of $\theta$, simulated pitch angle, as will be explained later. The K901 relay contact system merely functions to permit the student to fly on an "errorless" pitch attitude gyro system (wherein $\theta_i = \theta$) in order to enhance the instructional value of the training by comparison. Relay K901 is actuated by means of switch S1301 which energizes the coil of K901 as shown in Fig. 13.

Figure 10A:
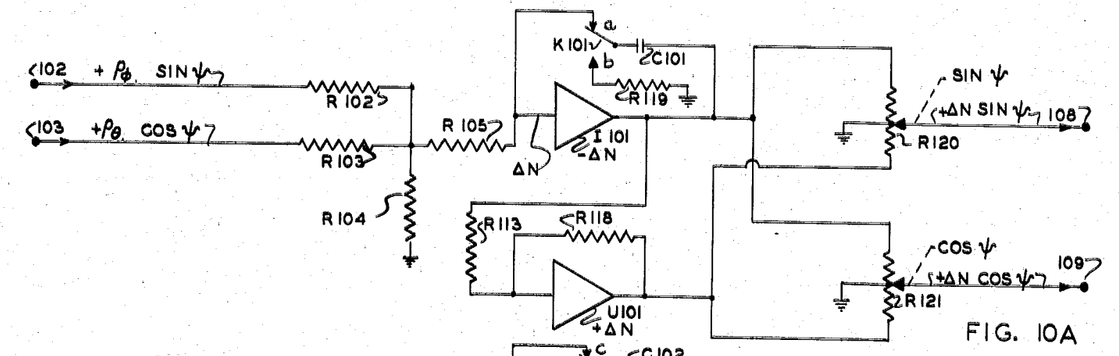
Figs. 10A and 10B are circuit diagrams illustrating how some of the quantities necessary to the generation of the precession rates of an attitude gyro instrument may be generated.

Referring now to Fig. 10a, wherein are described method and means for deriving certain of the simulated error terms described in connection with Figs. 8 and 9 above, an input voltage commensurate with $+p\phi \sin \Psi$, the first term of the expression 8 for $\dot{\Delta}_N$, is derived as explained in connection with Fig. 11 below, and applied via terminal 102 and summing resistor R-102 to the input circuit of electronic integrator I101 at the junction of resistors R104 and R105. A further input voltage, commensurate with $+p_\theta \cos \Psi$, the second term of the expression for $\dot{\Delta}_N$ in equation 8 is derived as explained below in connection with Fig. 11, and applied via terminal 103 and summing resistor R103 to the input circuit of electronic integrator I101. The quantities summed at the input of the integrator I101 are thus commensurate with the terms of the right hand side of Equation 8 for $\dot{\Delta}_N$, and the output voltage of the integrator will thus be the integral with respect to time of the terms of this equation, and will in fact be a measure of $\Delta_N$ as defined above. The output $-\Delta_N$ of integrator I101 is applied to excite one end of each of two center-tapped potentiometers R120 and R121 and is also applied by summing resistor R113 to the phase-changing amplifier U101 to derive an output potential commensurate with $+\Delta_N$ to excite the other extremities of potentiometers R120 and R121. The slider of R120 is positioned by a mechanical shaft output commensurate with $\sin \Psi$ derived from a conventional flight simulator system, and the slider of R121 is positioned in like manner by a shaft output commensurate with $\cos \Psi$, these shaft outputs being derived from the heading servo shaft of a conventional flight simulator by means of a Scotch Yoke or similar mechanical device. The voltages appearing at terminals 108 and 109 are thus commensurate with $+\Delta_N \sin \Psi$ and $+\Delta_N \cos \Psi$ respectively, and are used as explained in connection with Equations 8 and 9 above. The feedback capacitor C101 of electronic integrator I101 is connected to the input terminal via the normal closed relay contact K101$_a$. The purpose of the K101 relay contact system in connection with the electronic integrators I101 and I102 will be described later in connection with simulated caging of the system.

Figure 10B:
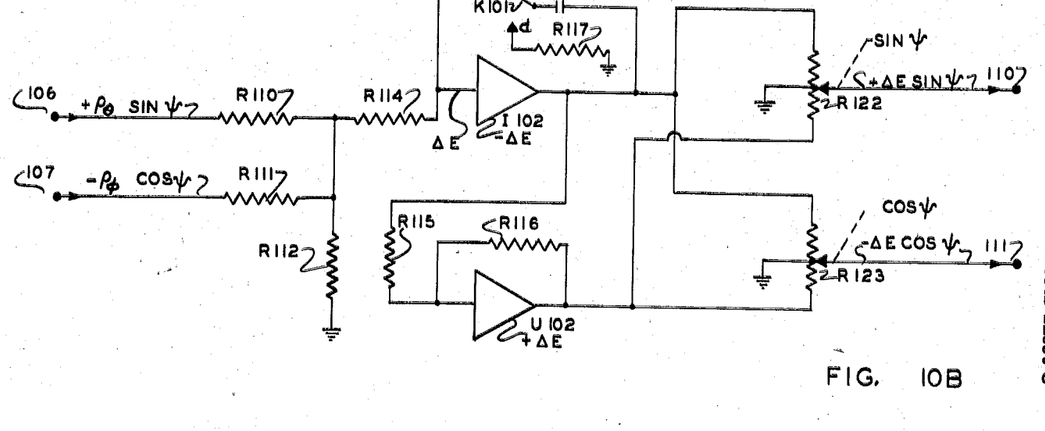

Referring to Fig. 10B, a voltage commensurate with $p_\theta \sin \Psi$, which is the first term of the expression of Equation 9 for $\dot{\Delta}_E$ is derived as described below in connection with Fig. 11, and applied via terminal 106 and summing resistor R110, to the input circuit of electronic integrator I102. An input quantity represents the second term of Equation 9, $-p_\phi \cos \phi$, is similarly derived and fed to the input of integrator I102 via summing resistor R111. The voltage quantities summed at the input of electronic integrator I102 are thus commensurate with the terms of the right hand side of Equation 9 for $\dot{\Delta}_E$, and the voltage output of I102 is thus commensurate with the time integral of this expression and is therefore a measure of $\Delta_E$ as defined above.

The voltage output of electronic integrator I102 is applied to excite one extremity of each of center tapped potentiometers R122 and R123, and is also applied via summing resistor R115 to derive an output voltage of opposite polarity which is applied to the other extremities of each of resistors R122 and R123. The sliders of R122 and R123 are positioned by mechanical shaft outputs commensurate with sin Ψ and cos Ψ respectively, derived from a conventional simulated flight system heading angle servo shaft by means of a Scotch Yoke or similar mechanical device. The slider outputs from potentiometers R122 and R123 are commensurate with the terms $+\Delta_E \sin \Psi$ and $-\Delta_E \cos \Psi$ respectively. Again, the feedback capacitor C2 of electronic integrator I102 is connected to the input circuit of I102 via normally closed relay contact K101c for reasons to be described later in connection with simulated "caging" of the system.

The outputs representing $+\Delta_E \sin \Psi$ and $-\Delta_E \cos \Psi$ are fed to terminals 110 and 111 respectively and are used in connection with Figs. 8 and 9 as described previously.

Figure 11A:
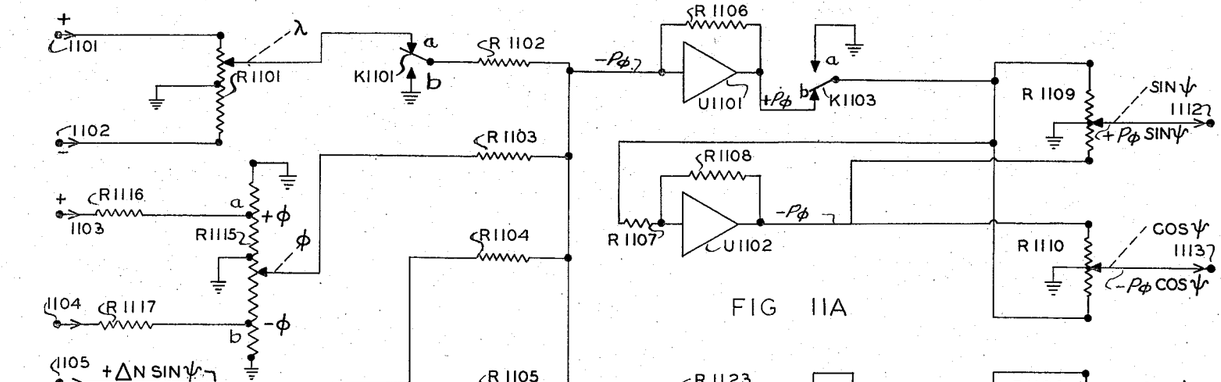
Figs. 11A and 11B are circuit diagrams showing how the precession rates of a simulated attitude gyro instrument may be generated.

Referring now to Fig. 11a which shows method and means whereby various simulated quantities require in connection with the system described in Figs. 10a and 10b are derived, the center-tapped potentiometer R1101 is excited at its opposite ends by negative and positive polarity input voltages from power supply terminals 1101 and 1102, its slider being positioned by a mechanical shaft output derived from the λ servo system of a conventional flight simulator system. The voltage appearing at the slider of R1101 is applied via the normally closed relay contact K1101a and summing resistor R1102 to the input of summing amplifier U1101, having conventional feedback means R1106.

The center-tapped potentiometer R1115 is excited via terminals 1103 and 1104 and resistors R1116 and R1117 with positive and negative voltages applied to points a and b, respectively. The slider of potentiometer R1115 is controlled by the mechanical shaft output of the φ or bank angle servo of a conventional flight simulator system, the voltage appearing at the slider being applied via summing resistor R1103 to the input circuit of summing amplifier U1101. A further voltage, representing $\Delta_N \sin \Psi$, derived as explained above in connection with Fig. 10a is fed back to terminal 1105 of Fig. 11a, and thence via summing resistor R1104 to the input circuit of amplifier U1101. A further quantity commensurate with $-\Delta_E \cos \Psi$, derived as explained in connection with Fig. 10b above, is fed back to terminal 1106 of Fig. 11a and thence via summing resistor R1105 to the input circuit of amplifier U1101. The voltages summed at the input of amplifier U1101 are thus commensurate with the terms of the expression $$-\lambda + \phi + \Delta_N \sin \Psi - \Delta_E \cos \Psi$$

which by substitution and re-arrangement can be seen to be equal to the right hand side of Equation 6 above for $p_\phi$, except that the sign is negative.

The output of amplifier U1101, changed in sign, is a voltage commensurate with $+p_\phi$, and is applied via relay contact K1103b when closed to excite one extremity of each of the center-tapped potentiometers R1109 and R1110, and is at the same time fed via summing resistor R1107 to the phase-changing buffer amplifier U1102 having feedback resistor R1108 to provide an output voltage commensurate with $-p_\phi$, which is applied to excite the lower extremities of potentiometers R1109 and R1110. The sliders of potentiometers R1109 and R1110 are position by mechanical shaft outputs commensurate with sin Ψ and cos Ψ respectively derived mechanically as explained above. By this expedient, the voltages appearing at the sliders of R1109 and R1110 are respectively commensurate with $p_\phi \sin \Psi$ and $-p_\phi \cos \Psi$, and are applied via terminals 1112 and 1113 to the appropriate input terminals of Figs. 10a and 10b as described above.

Figure 11B:
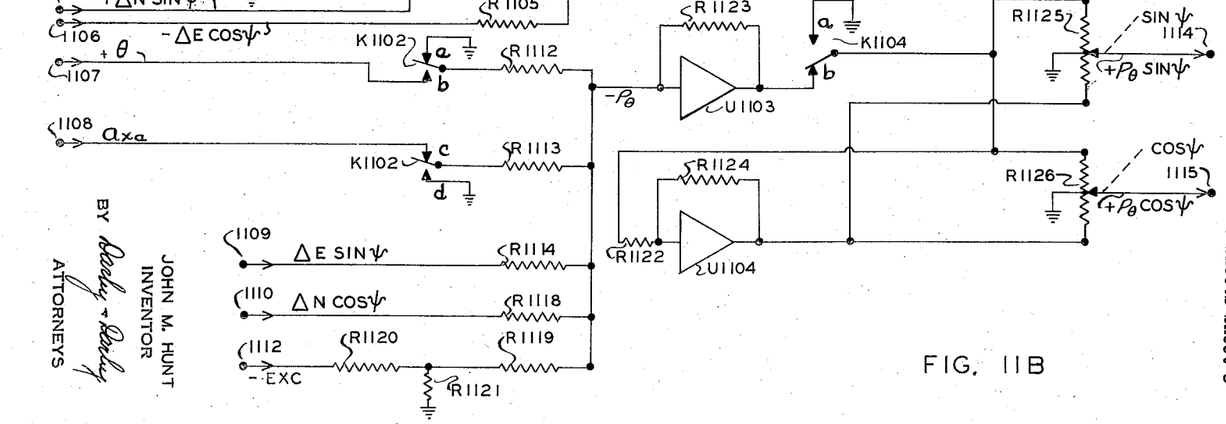

Turning now to Fig. 11b, wherein are shown method and means for deriving the remaining input quantities required in connection with Figs. 10a and 10b above, an input voltage commensurate with $+\theta$, derived from a conventional flight simulator system is applied via terminal 1107 and relay contact K1102a, when closed, through summing resistor R1112 to the input circuit of summing amplifier U1103, which is equipped with a conventional feedback resistor R1123. The purpose of this θ input will become apparent later when the caging function is described in detail.

An input voltage commensurate with $A_{x_a}$, the simulated forward acceleration of the simulated aircraft is derived from a conventional flight simulator system and applied via terminal 1108 and normally closed relay contact K1102c through summing resistor R1113 to the input terminal of amplifier U1103. Another input quantity commensurate with expression $\Delta_E \sin \Psi$, derived as explained in connection with Fig. 10b above is fed back to terminal 1109 of Fig. 11b and thence via summing resistor R1114 to the input circuit of summing amplifier U1103. A quantity commensurate with the expression $+\Delta_N \cos \Psi$, also derived as explained in connection with Fig. 10a above is fed back to terminal 1110 of Fig. 11b and thence via summing resistor R1118 to the input terminal of summing amplifier U1103. As stated above, an exemplary gyro might be corrected for erection turn errors during a standard or "rate one" turn of 3°/min. by means of a forward tilt of the gyro spin axis of 2°. A quantity commensurate with this 2° whose purpose is to simulate the 2° forward tilt of the simulated gyro spin axis is derived by exciting the series resistor network comprising R1120 and R1121 with a constant negative excitation voltage at terminal 1112, and feeding the voltage developed at the junction of R1120 and R1121 via summing resistor R1119 to the input terminal of amplifier U1103. This voltage is scaled to accord with the magnitude and sign of $\Delta_\theta$ for a "rate one" turn or standard so that in these conditions the sum of the terms $+2° - \Delta_\theta$ is zero, and simulates the corrective function of the 2° tilt in a real instrument. As $\Delta_\theta$ changes in magnitude and sign during other than "standard" turn conditions, this quantity will evidently depart from zero in the desired manner.

The voltage quantities summed at the input of amplifier U1103 are thus commensurate with the terms of Equation 7 above for $p_\theta$ viz:

$$-P_\theta = f_1(1.78 A_{x_a} + 2° - \Delta_\theta) \tag{7}$$

the constant terms being effected in conventional manner by appropriate resistance scaling. The output of summing amplifier U1103, which is positive in sign, is therefore a measure of $p_\theta$, and is applied via relay contact K1104b when closed to excite the upper extremities of center-tapped potentiometers R1125 and R1126. The positive $p_\theta$ output of amplifier U1103 is also applied via summing resistor R1122 to the input of the phase-changing buffer amplifier U1104, whose output, which is a measure of $-p_\theta$, is used to excite the lower extremities of potentiometers R1125 and R1126. Resistor R-1124 is the feedback resistor of amplifier U1104. The sliders of potentiometers R1125 and R1126 are motivated by mechanical shaft outputs commensurate with the quantities +sin Ψ and +cos Ψ derived from a conventional flight simulator system. The output voltages appearing at the sliders of potentiometers R1125 and R1126 are thus commensurate with $+p_\theta \sin \Psi$ and $-p_\theta \cos \Psi$ respectively, and are applied via terminals 1114 and 1115 to provide input quantities required in connection with the system described in Fig. 10b above.

Figure 15:
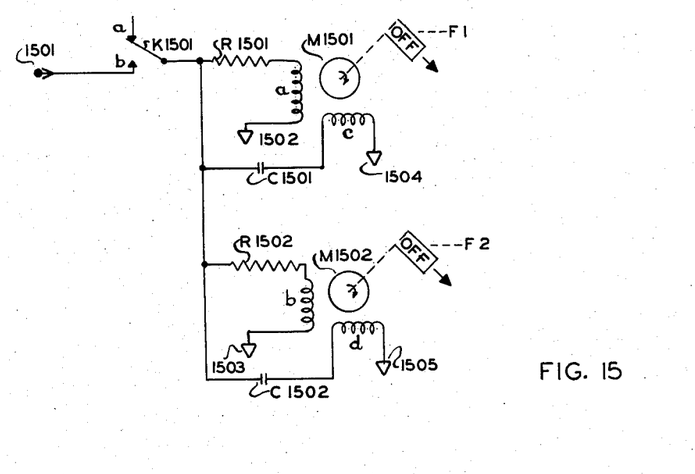
Fig. 15 is a circuit diagram showing an exemplary means by which caging of an attitude gyro instrument may be simulated.

Turning now to Fig. 15, which describes method and means for indicating when the simulated gyro system is "caged," power is supplied via terminal 1501 and relay contact K1501b when closed to excite winding "a" of 2-phase motor M1501, and winding "b" of 2 phase motor M1502, the power return being made via terminals 1502 and 1503 respectively. Excitation to these windings is limited to M1501 motor winding "a," and M1502 motor winding "b" by resistors R1501 and R1502 respectively. The quadrature phase winding c of motor M1501 and the quadrature phase winding d of motor M1502 are excited via terminal 1501 and relay contact K1501b when closed, condensers C1501 and C1502 being their respective phase shift capacitors, the return power connection being made via terminals 1504 and 1505 respectively. The mechanical shaft outputs of motors M1501 and M1502 are used to position the warning "Off" flags in the student's and instructor's instruments respectively, operation being effected by means of caging switch S120 (Fig. 12), which is provided in the student pilot's instrument only. Excitation of winding K902, Fig. 12 by closure of the caging knob switch S120, operates K902 relay contacts b, d, f and h to ground the input circuits of summing amplifier U901, Fig. 9, thereby removing all input signals from the $\theta_i$ indicated pitch angle servo system.

Operation of switch S120 also energizes relays K1101 and K1102. Operation of contact K1102b Fig. 11b applies a potential commensurate with $\theta$, the instantaneous true pitch angle to the input of summing amplifier U1103 Fig. 11b, for reasons which will be later explained, while relay contacts K1101b and K1102a operate to ground the input circuits of summing amplifiers U1101 and U1103 respectively, thereby removing the $p_\phi$ and $P_\theta$ input terms from the systems of Figs. 10a and 10b. Operation of S120 also energizes relay coil K701, Fig. 12, to operate relay contacts K701b and K701d Fig. 7. This removes the normal 400 c.p.s. synchro differential excitation from the windings of synchro control transformers S703 and S704, and replaces it with a steady state 400 c.p.s. signal derived directly from the 400 c.p.s. system by means of the fixed potential divider formed by resistors R702 and R703. It should be emphasized that this method of forcing the indicated bank angle $\phi$ servo to a zero indication is exemplary only and other means such as an additional synchro transmitter fixed for transmitting a zero indication to the remote horizon bars might well be switched in by the caging switch in place of synchro transmitter S703.

The effect of the actions described above on closure of S120 will cause the $\theta_1$ servo to drive to zero indicated pitch angle, and the internal roll axis of the simulated gyro instrument to drive to zero, and the simulated instrument will thus indicate zero when caged. As already suggested alternate methods are illustrated in Figs. 7 and 9 for modifying correct quantities by error quantities. It should be obvious that the selection of the method of zeroing the indication during the existence of the caged condition is dependent upon the particular method adopted.

As briefly mentioned in the foregoing, it is necessary during the entire time that the simulated instrument is caged that the $\Delta_\phi$ and $\Delta_\theta$ Euler angle error voltages assume such values comparable with the instantaneous values of pitch angle and bank angle from the flight computer. Otherwise, it would not be possible to adequately simulate erection when the simulated gyro is uncaged at other than zero simulated pitch and bank angles. In order that the $\Delta_\theta$ and $\Delta_\phi$ systems assume correct voltages when re-established, it is, of course, necessary that the $\Delta_N$ and $\Delta_E$ systems from which these quantities are derived be continuously adjusted also. The method of accomplishing this automatic adjustment in the instant invention is outlined below.

When the real instrument is caged, the erection system is ineffective such that the pendulous angle may be considered zero. For purposes of maintaining $\Delta_\theta$ and $\Delta_\phi$ equal to the instantaneous values of pitch angle $\theta$ and bank angle $\phi$ respectively, $G_y$ and $G_x$ of Equations 6 and 7 above may be considered equal to the instantaneous bank angle $\phi$ and pitch angle $\theta$. We may accordingly rewrite equations for caged conditions as $$P_\phi = f1(-\phi - \Delta_\phi)$$

and $$P_\theta = f1(-\theta + 2° - \Delta_\theta)$$

Figure 14:
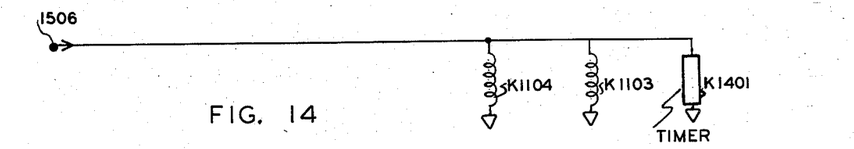
Fig. 14 is a circuit diagram useful in understanding some further relay functions in the illustrative system.

In the invention, the above substitution is made for the source of the $P_\phi$ and $P_\theta$ terms when switch S120 energizes relay K101 coil, Fig. 12, to operate relay contacts K101b and K101d, Figs. 10a and 10b respectively. Operation of contacts K101b and K101d has the effect of reducing the time constants of electronic integrators I101 and I102, as shown in Figs. 10A and 10B, by transferring the normal integrating capacitors C101 and C102 to ground through resistors R119 and R117 respectively. This has the effect of causing the erection system to act as a fast slaving system to cause $\Delta_\phi$ to become equal to $-\phi$ and $\Delta_\theta$ to become equal to $-\theta + 2°$, with the result that the computed expressions for $\theta_i$ and $\phi_i$ will both become equal to zero. When the simulated instrument is uncaged, the $\Delta_N$ integrator I101, and the $\Delta_E$ integrator I102 return to their normal time constants by restoration of integrating capacitors C101 and C102, this being effected by reclosure of relay contacts K101a and K101c respectively. The instantaneous values of the $\Delta_N$ and $\Delta_E$ voltages obtaining immediately before uncaging are thus established as the initial values of the integral. These values slowly approach zero as the simulated erection system operates. It should be noted that when the simulated instrument is first turned on at the start of a "flight," all the servos associated with it are turned on instantaneously, and no attempt is made to establish initial voltages at the $\Delta_E$ and $\Delta_N$ integrators unless the instrument is "caged." When simulated instrument "failure" occurs, the $P_\phi$ and $P_\theta$ inputs are reduced to zero by relays K1103 and K1104, Figs. 11A and 11B, to simulate failure of the erection system, residual random input voltages causing the $\Delta_E$ and $\Delta_N$ integrators to drift from their initial values. A delay of approximately five minutes then occurs before the delayed A.C. power relay, which by way of example might be a Hayden timer, K–1401, Fig. 14, removes power from the indicated pitch angle servo and the roll angle servo of the simulated attitude gyro. As shown in Fig. 14, the operating coils of relays K1103 and K1104 and timer K–1401 all are connected to terminal 1506 to be energized during simulated "failure" conditions.

Since certain changes may be made in carrying out the teachings of this application without departing from the scope of the invention, it is intended that all matter contained in the above description or shown in the accompanying drawings shall be interpreted as illustrative and not in a limiting sense. For example, while direct current computation has been used in the above disclosed embodiment, it is obvious that the invention can be practiced using A.C. computation techniques using components adapted for that purpose. Further, mechanical differentials or other types of electrical self synchronous devices may be substituted for the electrical synchros illustrated. Also the shaped potentiometers described herein may be padded or excited non-linearly from tapped voltage dividers. If linear potentiometers are used, the functions may be generated by a non-linear motion converting mechanism driven by a shaft representing the independent variable. Moreover, while many of the summing devices have been shown herein as comprising parallel-adding feedback amplifiers they may be replaced by a variety of equivalent summing devices, such as, series summing means.

Having described my invention, what I claim as new and desire to secure by Letters Patent is:

1. A grounded flight trainer including means for simulating an attitude gyro in a simulated aircraft comprising means for deriving a first quantity commensurate with the simulated pitch angle of said simulated aircraft, means for deriving a second quantity commensurate with the simulated bank angle of said simulated aircraft, means for deriving a third quantity commensurate with the simulated gyro bank angle error resulting from the effect of simulated side accelerations of said simulated aircraft on the operation of the erection system of said simulated aircraft, means for deriving a fourth quantity commensurate with the simulated gyro pitch angle error resulting from the effect of simulated longitudinal accelerations of said simulated aircraft on the operation of the erection system of said simulated aircraft, an artificial horizon, means responsive to said first and fourth quantities for positioning said artificial horizon in accordance with the simulated indicated pitch attitude of said simulated aircraft, means responsive to said second and third quantities for positioning said artificial horizon in accordance with the simulated indicated bank attitude of said simulated aircraft.

2. A grounded flight trainer including means for simulating an attitude gyro in a simulated aircraft comprising means for deriving a first quantity commensurate with the simulated pitch angle of said simulated aircraft, means for deriving a second quantity commensurate with the simulated bank angle of said simulated aircraft, means for deriving a third quantity commensurate with the simulated gyro bank angle error resulting from the effect of simulated side accelerations of said simulated aircraft on the operation of the erection system of said simulated aircraft, means for deriving a fourth quantity commensurate with the simulated gyro pitch angle error resulting from the effect of simulated longitudinal accelerations of said simulated aircraft on the operation of the erection system of said simulated aircraft, an artificial horizon, means responsive to said first and fourth quantities for positioning said artificial horizon in accordance with the simulated indicated pitch attitude of said simulated aircraft, means responsive to said second and third quantities for positioning said artificial horizon in accordance with the simulated indicated bank attitude of said simulated aircraft, caging means for modifying said means responsive to said first and fourth quantities and said means responsive to said second and third quantities such that said artificial horizon indicates zero simulated pitch and bank angles.

3. A grounded flight trainer including means for simulating an attitude gyro in a simulated aircraft comprising means for deriving a first quantity commensurate with the simulated pitch angle of said simulated aircraft, means for deriving a second quantity commensurate with the simulated bank angle of said simulated aircraft, means for deriving a third quantity commensurate with the simulated gyro bank angle error resulting from the effect of simulated side accelerations of said simulated aircraft on the operation of the erection system of said simulated aircraft, means for deriving a fourth quantity commensurate with the simulated gyro pitch angle error resulting from the effect of simulated longitudinal accelerations of said simulated aircraft on the operation of the erection system of said simulated aircraft, an artificial horizon, means responsive to said first and fourth quantities for positioning said artificial horizon in accordance with the simulated indicated pitch attitude of said simulated aircraft, means responsive to said second and third quantities for positioning said artificial horizon in accordance with the simulated indicated bank attitude of said simulated aircraft, selective caging actuating means, a first switch means actuated by said caging actuating means, for modifying said means responsive to both said first and fourth quantities and said means responsive to said second and third quantities such that said artificial horizon indicates zero simulated pitch and bank angles, a second switch means actuated by said caging actuating means for modifying both said means for deriving said third quantity and said means for deriving said fourth quantity, such that said third quantity thereby is maintained equal and opposite to said second quantity and said fourth quantity being maintained equal and opposite to said first quantity.

4. A grounded flight trainer including means for simulating an attitude gyro in a simulated aircraft comprising means for deriving a first quantity commensurate with the simulated pitch angle of said simulated aircraft, means for deriving a second quantity commensurate with the simulated bank angle of said simulated aircraft, means for deriving a third quantity commensurate with the simulated gyro bank angle error resulting from the effect of simulated side accelerations of said simulated aircraft on the operation of the erection system of said simulated aircraft, means for deriving a fourth quantity commensurate with the simulated gyro pitch angle error resulting from the effect of simulated longitudinal accelerations of said simulated aircraft on the operation of the erection system of said simulated aircraft, an artificial horizon, means responsive to said first and fourth quantities for positioning said artificial horizon in accordance with the simulated indicated pitch attitude of said simulated aircraft, means responsive to said second and third quantities for positioning said artificial horizon in accordance with the simulated indicated bank attitude of said simulated aircraft, selective caging actuating means, a first switch means actuated by said caging actuating means, for modifying said means responsive to both said first and fourth quantities and said means responsive to said second and third quantities such that said artificial horizon indicates zero simulated pitch and bank angles, a second switch means actuated by said caging actuating means for modifying both said means for deriving said third quantity and said means for deriving said fourth quantity, such that said third quantitiy thereby is maintained equal and opposite to said second quantity and said fourth quantity being maintained equal and opposite to said first quantity plus the angle through which the spin axis of the simulated gyro is tilted forward.

5. A grounded flight trainer including means for simulating the precessional errors of an attitude gyro in a simulated aircraft comprising means for representing a first quantity commensurate with the angular precession rate of the simulated gyro spin axis about the gyro roll axis, means for representing a second quantity commensurate with the instantaneous angular precession rate of the simulated gyro spin axis about the gyro pitch axis, means for deriving a third quantity commensurate with the heading of said simulated aircraft, means responsive to said first, second and third quantities for deriving a fourth quantity commensurate with the angular precessional displacement of the simulated gyro spin axis about an East-West horizontal line, means responsive to said first, second and third quantities for deriving a fifth quantity commensurate with the angular precessional displacement of the simulated gyro spin axis about a North-South horizontal line, means responsive to said third, fourth and fifth quantities for deriving a sixth quantity commensurate with the bank angle precessional error, means responsive to said third, fourth and fifth quantities for deriving a seventh quantity commensurate with the pitch angle precessional error, means responsive to said sixth quantity and the instantaneous angle of simulated pendulous vertical of the simulated erection system with respect to simulated true vertical about the simulated aircraft x axis for deriving said first quantity, and means responsive to said seventh quantity, the normal forward tilt of the spin axis of the simulated gyro and the instantaneous angle of the simulated pendulous vertical of the erection system with respect to the simulated true vertical measured about the simulated aircraft Y axis.

6. A grounded flight trainer including means for simulating the precessional errors of an attitude gyro in a simulated aircraft comprising means for representing a first quantity commensurate with the angular precession rate of the simulated gyro spin axis about the gyro roll axis, means for representing a second quantity commensurate with the instantaneous angular precession rate of the simulated gyro spin axis about the gyro pitch axis, means for deriving a third quantity commensurate with the heading of said simulated aircraft, means responsive to said first, second and third quantities for deriving a fourth quantity commensurate with the angular precessional displacement of the simulated gyro spin axis about an East-West horizontal line, means responsive to said first, second, and third quantities for deriving a fifth quantity commensurate with the angular precessional displacement of the simulated gyro spin axis about a North-South horizontal line, means responsive to said third, fourth and fifth quantities for deriving a sixth quantity commensurate with the bank angle precessional error, means responsive to said third, fourth and fifth quantities for deriving a seventh quantity commensurate with the pitch angle precessional error, means responsive to said sixth quantity and the instantaneous angle of simulated pendulous vertical of the simulated erection system with respect to simulated true vertical about the simulated aircraft X axis for deriving said first quantity, and means responsive to said seventh quantity, and the instantaneous angle of the simulated pendulous vertical of the erection system with respect to the simulated true vertical measured about the simulated aircraft Y axis.

7. Apparatus for use in an aircraft simulator for computing a simulated Euler angle error quantity of an attitude gyro due to acceleration of a simulated aircraft, comprising in combination, first means for deriving a first potential commensurate with simulated angular displacement of a simulated gyro axis about a first fixed reference direction; second means for deriving a second potential commensurate with simulated angular displacement of said gyro axis about a second fixed direction perpendicular to said first reference direction, said first and second means comprising means for deriving two further potentials commensurate with simulated instantaneous precession rates of the simulated gyro roll axis and the simulated gyro pitch axis, means for resolving each of said further potentials in accordance with simulated heading to provide component voltages, means for combining a first pair of said component voltages to provide a fifth potential, means for combining a second pair of said component voltages to provide a sixth potential, and separator integrator means responsive to said fifth and sixth potentials to provide said first and second potentials; means for resolving said first and second potentials in accordance with simulated aircraft heading to derive third and fourth potentials commensurate with components of said displacements, means for combining said third and fourth potentials to provide a simulated gyro Euler angle error quantity, and a simulated Euler angle indicator connected to be corrected in position in accordance with said simulated gyro Euler angle quantity.

8. Apparatus according to claim 7 in which one of said means for deriving a further potential commensurate with a simulated instantaneous precession rate comprises means for deriving a computer quantity commensurate with the simulated instantaneous apparent vertical with respect to one axis of said simulated aircraft, comparison means for subtracting said computer quantity from said simulated Euler angle error quantity to provide a difference quantity, and means for modifying said difference quantity in accordance with an assumed erection rate transfer function of said simulated attitude gyro.

9. Apparatus according to claim 7 in which said integrator means comprise a pair of separate operational amplifiers connected to be responsive to said fifth and sixth potentials, each of said operational amplifiers having a switchable feedback capacitor connection, and a simulated gyro caging switch operable to switch said feedback connections, thereby connecting said operational amplifiers to operate as amplifiers during simulated caged conditions and connecting said operational amplifiers to operate as electronic integrators during simulated uncaged conditions.

10. Apparatus according to claim 8 having further means for providing a further computer quantity commensurate with the magnitude of a simulated gyro tilt correction and for applying said further computer quantity to said comparison means.

11. Apparatus according to claim 8 in which said means for deriving a computer qauntity commensurate with the simulated instantaneous apparent vertical comprises means for deriving a first potential commensurate with the ratio between lateral acceleration and vertical acceleration of said simulated aircraft, means for deriving a second potential commensurate with simulated true bank angle of said simulated aircraft, and means for subtracting said first and second potentials to provide said computer quantity commensurate with the simulated instantaneous apparent vertical.

References Cited in the file of this patent

UNITED STATES PATENTS

| | | |
|---|---|---|
| 2,292,451 | Koster | Aug. 11, 1942 |
| 2,458,586 | Giroud | Jan. 11, 1949 |
| 2,472,888 | Cunningham | June 14, 1949 |
| 2,493,015 | Newton | Jan. 3, 1950 |
| 2,578,177 | Dehmel | Dec. 11, 1951 |
| 2,597,784 | Field | May 10, 1952 |
| 2,628,434 | Dehmel | Feb. 17, 1953 |
| 2,655,046 | Seifried | Oct. 13, 1953 |
| 2,696,597 | Chombard | Dec. 7, 1954 |
| 2,784,501 | Stern et al. | Mar. 12, 1957 |
| 2,793,445 | Wakefield | May 28, 1957 |
| 2,842,867 | Dehmel | July 15, 1958 |

FOREIGN PATENTS

| | | |
|---|---|---|
| 532,348 | Canada | Oct. 30, 1956 |